United States Patent

Kobayashi

[11] 3,855,522
[45] Dec. 17, 1974

[54] ELECTROMAGNETIC TYPE MEASURING APPARATUS FOR DIGITALLY MEASURING ELECTRIC CONDUCTIVITY

[75] Inventor: Goro Kobayashi, Oiso-Machi, Japan

[73] Assignees: Oki Electric Industry Co., Ltd.; Japan Society for the Promotion of Machine Industry, both of Tokyo, Japan; part interest to each

[22] Filed: May 11, 1973

[21] Appl. No.: 359,316

[30] Foreign Application Priority Data
May 18, 1972   Japan.................... 47-57231

[52] U.S. Cl. ................. 324/30 A, 324/30 R
[51] Int. Cl. ............................... G01n 27/42
[58] Field of Search................... 324/30 A, 30 R

[56] References Cited
UNITED STATES PATENTS
3,316,547   4/1967   Ammann ................. 340/347
3,603,873   9/1971   Cirulis .................... 324/30 R

*Primary Examiner*—Alfred E. Smith
*Assistant Examiner*—Rolf Hille
*Attorney, Agent, or Firm*—Dike, Bronstein, Roberts, Cushman and Pfund

[57] ABSTRACT

In an electromagnetic type conductivity measuring apparatus wherein two magnetic cores are immersed in conductive liquid, the one core is excited by AC and an output coil wound on the other core produces an output voltage corresponding to the conductivity of the liquid, there are provided a rectifier for rectifying the output voltage to produce rectified outputs of positive and negative polarities, an integrator, switch means for selectively supplying the positive or negative rectified output to the integrator, a comparator for comparing the output from the integrator with a zero potential, and a pulse counter controlled by the output from the comparator whereby to provide a digital output corresponding to the conductivity of the liquid.

6 Claims, 4 Drawing Figures

3,855,522

ELECTROMAGNETIC TYPE MEASURING APPARATUS FOR DIGITALLY MEASURING ELECTRIC CONDUCTIVITY

BACKGROUND OF THE INVENTION

This invention relates to an electromagnetic type measuring apparatus for digitally measuring the electric conductivity (hereinafter, merely designated as conductivity) of conductive liquids to provide a digital output corresponding to the ratio of the measured conductivity to a standard or reference conductivity.

To have better understanding of the invention one example of the prior art electromagnetic induction type conductivity measuring apparatus will first be described with reference to FIG. 1. The apparatus shown in FIG. 1 comprises a pair of magnetic cores 1 and 2. Core 1 is provided with a primary or exciting coil 3 and the core 2 is provided with an output coil 4, a calibration coil 5 and a standard or reference coil 6. 7 designates a source of alternating current and the voltage thereof is applied to the reference coil 6 through a potentiometer. One stationary contact 10 of a transfer switch 9 is connected to one terminal of primary coil 3 and the other stationary contact 11 is connected to one terminal of calibration coil 5 through a resistor 12. The opposite terminals of the primary coil and the calibration coil 5 are connected to one terminal of source 7 and the movable contact of the transfer switch 9 is connected to the other terminal of the source 7. One terminal of reference coil 6 is connected to said one terminal of source 7 while the other terminal is connected to an intermediate point of the potentiometer 8 through a resistor 13 having a resistance value corresponding to the standard conductivity.

With this apparatus the conductivity is measured in the following manner. When the transfer switch 9 is thrown to contact 10 and cores 1 and 2 are immersed in the liquid to be measured, if the liquid is electroconductive, a current induced by the magnet flux flowing through core 1 would flow through the liquid. This current will link core 2, as shown by dotted line, to induce an output voltage in the output coil 4 which is proportional to the conductivity of the liquid. Since the reference coil 6 is wound to produce a magnetic flux in core 2 of the polarity opposite to the that of the flux induced in the core by the current flowing through the liquid and linking core 2, the voltage induced in output coil 4 will be proportional to the difference between these two fluxes.

The output voltage of such a conductivity measuring apparatus, however, is influenced by the magnetic characteristics of the magnetic cores 1 and 2 and variations in the source voltage. To avoid such influence a servo-mechanism is often incorporated into the voltage divider 8. Such servo-mechanism is constructed to adjust the potentiometer 8 so as to bring to zero the output voltage and is known as the zero method. Such arrangement can determine the ratio of the conductivity to be measured to the standard conductivity in terms of the position of the sliding arm of the potentiometer, that is the ratio of voltage division.

Incorporation of such servo-mechanism, however, not only complicates the construction but also increases the chance of faults of the measuring apparatus. Furthermore, the prior art measuring apparatus is required to use a calibration coil for calibrating the scale of the indicating instrument.

Further, it is a recent trend to digitalize the output of the measuring apparatus. In the prior art apparatus, since the output of the output coil is converted into a digital quantity by means of a conventional analogue-digital (A–D) converter, any error in the output voltage would be reflected into the output of the analog digital converter.

SUMMARY OF THE INVENTION

Accordingly, it is an object of this invention to provide an extremely accurate electromagnetic type measuring apparatus for digitally measuring the electric conductivity of liquid free from the disadvantages described above.

Another object of this invention is to provide a new and improved electromagnetic conductivity measuring apparatus which is easy to operate and can readily confirm its operation.

According to this invention these and other objects of the invention can be accomplished by providing an electromagnetic induction type conductivity measuring apparatus of the type comprising a first magnetic core, a first coil wound on the magnetic core, a source of alternating current, first switch means for supplying an exciting current to the first coil, a second magnetic core, a second coil wound on the second core, a voltage divider connected across the source for impressing a predetermined proportion of the voltage of the source across the second coil, and an output coil wound on the second core, the first and second cores being adapted to be immersed in conductive liquid whose conductivity is to be measured, characterized in that there are provided rectifier means for rectifying the voltage induced in the output coil to produce rectified outputs of positive and negative polarities, an integrator, second switch means for selectively supplying the positive or negative rectified output to the integrator, a comparator for comparing the output from the integrator with a zero potential, and a pulse counter controlled by the output from the comparator for providing a digital output corresponding to the conductivity of the liquid.

BRIEF DESCRIPTION OF THE DRAWINGS

The principle, organization and operation of the invention will be more fully understood from the following detailed description taken in conjunction with the accompanying drawings in which.

DESCRIPTION OF THE PREFERRED EMBODIMENTS

Figure 1:
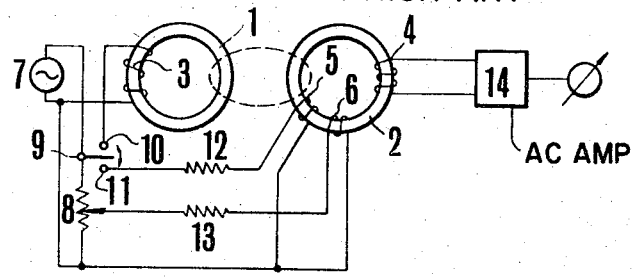
FIG. 1 shows a connection diagram of one example of a prior art electromagnetic induction type conductivity measuring apparatus.
Figure 2:
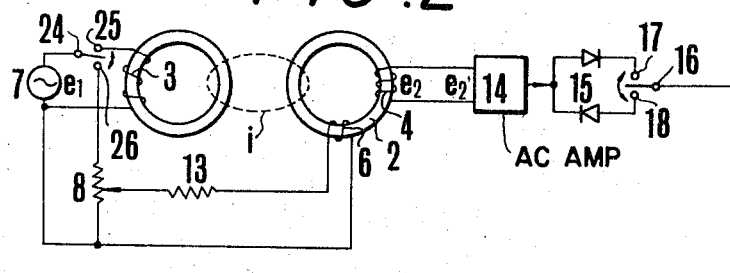
FIG. 2 is a connection diagram of one embodiment of the novel electromagnetic induction type digital measuring apparatus for measuring the conductivity of liquid constructed in accordance with this invention.

Referring now to FIG. 2, circuit elements corresponding to those shown in FIG. 1 are designated by the same reference numerals. The coil 5 has been eliminated and the transfer switch to input coil 3 and potentiometer 8 has been renumbered 24, 25 and 26. In this embodiment, the output voltage of the output coil 4 is applied to a rectifier circuit 15 including a pair of diodes of opposite polarities through an AC amplifier 14. The output of the rectifier circuit 15 is connected to opposite stationary contacts 17 and 18 through a transfer switch 16. The movable contact of transfer switch 18 is connected to a comparator 20 through an integrator 19 and the output from comparator 20 is applied to the inputs of an AND-gate circuit 22 together with the output from a pulse generator 21. The output of the AND-gate circuit 22 is applied to a pulse counter 23 which provides a digital quantity representing the conductivity of the liquid to be measured.

The measuring apparatus shown in FIG. 2 operates as follows. Let us denote the voltage of the AC source 7 by $e_1$. When transfer switch 24 is thrown to upper contact 25, core 1 will be energized by exciting coil 3. As above described when both cores 1 and 2 are dipped in the liquid to be measured, current $i$ will be induced in the liquid and a portion $i'$ of the induced current will link core 2 to generate a magnetic flux therein thereby inducing a voltage $e_2$ in the output coil 4, which is expressed by the following equation (1);

$$e_2 = j\,\omega\,(n_2\,\mu_2\,A_2/n_1\,l_2)\,k\,\rho\,e_1 \qquad (1).$$

where, $\omega$: the angular frequency of the source voltage $e_1$
$n_1$: the number of turns of the exciting coil 3
$n_2$: the number of turns of the output coil 4
$\mu_2$: the permeability of the magnetic core 2
$A_2$: the cross-sectional area of the magnetic core 2
$l_2$: the length of the magnetic path of the magnetic core 2
$k$: a coefficient representing the percentage of the portion $i'$ of the induced current which interlinks the magnetic core 2, and
$\rho$: the conductivity of the liquid.

On the other hand, when transfer switch 24 is thrown to lower contact 26, the voltage $e_2'$ induced in the output coil 4 is expressed by the following equation (2);

$$e_2' = j\,\omega\,(n_2\,n_2'\,\mu_2\,A_2/l_2\,m\,r)\,e_1 \qquad (2).$$

where, $n_2'$: the number of turns of the reference coil 6
$m$: the ratio of voltage division of the potentiometer 8,
$r$: the resistance of the resistor 13.

Assume now that transfer switch 16 is thrown to upper contact 17 when the transfer switch 24 is thrown to upper contact 25. Under these conditions, the output voltage $e_2$ of magnetic core 2 is amplified by amplifier 14, rectified by rectifier circuit 15 and is then integrated by integrator 19 for a definite interval $T_0$.

Figure 3:
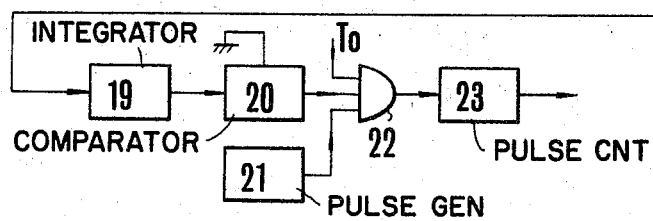
FIG. 3 shows a graph to explain the operation of an integrator utilized in this invention and FIG. 4 is a connection diagram showing a portion of a modified embodiment of this invention.

FIG. 3 shows the operation of the integrator 19. Dependent upon the magnitude of the output from rectifier circuit 15, with switches 24 and 16 thrown to contacts 25 and 17, respectively, the integral becomes $a_1, a_2, a_3 \ldots$ after interval $T_0$. Assuming now that transfer switches 24 and 16 are thrown to contacts 26 and 18, respectively, although the output voltage of output coil 4 is equal to $e_2'$, as the lower diode of the opposite polarity is connected in circuit with contact 18, the polarity of the output from the rectifier circuit is reversed whereby the output from the integrator 19 becomes zero after an interval T as shown in FIG. 3.

Comparator 20 functions to compare the output voltage from the integrator with a zero potential. With regard to output voltage $e_2$ the integrator output E is expressed by $$E = \int_0^{T_0} e_2\,dt = T_0 e_2 \qquad (3)$$

and with regard to output voltage $e_2'$ the integrator output $E'$ is expressed by $$E' = \int_{T_0}^{T_0+T} e_2'\,dt = T e_2' \qquad (4)$$

This means that the input level to the comparator from the integrator becomes zero after an interval $T_0 + T$.

If it is now assumed that AND gate circuit 22 is enabled immediately after the elapse of interval $T_0$ to commence the counting operation of the output pulse from pulse oscillator 21 by counter 23 and that the operation of the counter is caused to stop when the output from comparator 20 disappears, from equations (3) and (4), $$T = e_2/e_2'\,T_0 \qquad (5).$$

Substituting equation (5) into equations (1) and (2), we obtain $$T = [j\,\omega(n_2\,\mu_2\,A_2/n_1\,l_2)k\,\rho\,e_1/j\,\omega\,n_2\,n_2'(\mu_2\,A_2/l_2\,m\,r)\,e_1]\,T_0 = (k\,\rho\,m\,r/n_1\,n_2')\,T_0$$

When the resistance value r is adjusted such that $r = 1/\rho_0$ and the ratio of the voltage division m of potentiometer 8 is adjusted such that $m = n_1 n_2'/k$ then $$T = \rho/\rho_0\,T_0 \qquad (6).$$

Thus, the measurement of the conductivity $\rho$ of the liquid to be measured is accomplished by counting the interval T. The count of interval $T$ can be taken out as a digital output directly from the output from counter 23. It should be understood that it is also possible to directly display the conductivity without performing any conversion operation by merely adjusting the pulse frequency. The adjustment of the values of $r$ and $m$ is not always necessary in that it is only necessary to select semifixed values of these parameters by using a standard conductive liquid at the final stage of adjustment of the conductivity measuring apparatus.

Figure 4:
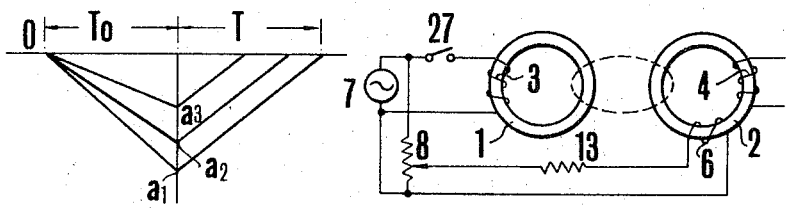

FIG. 4 shows a modified embodiment of this invention which can improve further the accuracy of the measurement. In this embodiment, a quotient between the difference between induced voltage $e_2$ corresponding to conductivity $\rho$ of the liquid and induced voltage $e_2'$ corresponding to standard conductivity $\rho_0$, and the induced voltage $e_2$ is used. In FIG. 4, when switch 27 is closed the output voltage from output coil 4 is expressed by $e_2 - e_2'$ and the ratio of this output voltage to the output voltage $e_2'$ under a condition when switch 27 is opened is expressed by the following equation (7) in the same manner as in the previous embodiment.

$$T = (e_2 - e_2'/e_2')\,T_0 = (\rho - \rho_0)/\rho_0\,T_0 \qquad (7).$$

Consequently even when the value of $\rho$ to be measured is close to the value of the standard conductivity, it is possible to determine the $\rho$ at a high accuracy.

The operation of the conductivity measuring apparatus of this invention can be readily confirmed. More particularly, in the circuit shown in FIG. 2 first transfer switch 24 is thrown to contact 26 to perform integration for interval $T_0$ and then while maintaining switch 24 in this position switch 16 is transferred to perform integration. At this time, since the rectified circuit 15 is supplied with the same input voltage, the integration time $T$ becomes equal to $T_0$, thereby enabling to confirm the operation of the measuring apparatus. The same purpose can also be accomplished when switch 24 is thrown to contact 25.

In addition to direct provision of a digital output, the measuring apparatus of this invention has the following advantages. Thus, as shown in equations (1) and (2), the output voltage obtained by the prior art measuring apparatus contains the source voltage $e_1$ and the constants $\mu_2$, $A_2$ and $l_2$ of the magnetic core, whereas the output voltage produced by the novel conductivity measuring apparatus does not contain such parameters as can be noted from equation (6). Especially, since the permeability $\mu_2$ is influenced by the ambient pressure and temperature the novel apparatus is eminently suitable for the measurement of salt content in deep sea water.

Furthermore, as the comparator is operated at a zero potential, by applying two inputs of different polarities to the integrator, the result of measurement can be made accurate because it is not affected by the variation of the source voltage.

In addition, as it is not necessary to use any such complicated mechanism as a servo-mechanism it is possible to provide a reliable and compact conductivity measuring apparatus. Also it is possible to confirm the operation of the conductivity of the transfer switch, and the operation of the apparatus is very simple.

Thus, it will be clear that the invention provides an improved electromagnetic induction type measuring apparatus for digitally measuring the conductivity of liquids stably and at high accuracies.

What is claimed is:

1. In an electromagnetic induction type conductivity measuring apparatus of the type comprising a first magnetic core, a first coil wound on said first magnetic core, a source of alternating current, first switch means for supplying an exciting current to said first coil, a second magnetic core, a second coil wound on said second core, a voltage divider connected across said source for impressing a predetermined proportion of the voltage of said source across said second coil, and an output coil wound on said second core, said first and second cores being adapted to be immersed in conductive liquid whose conductivity is to be measured, the improvement which comprises rectifier means coupled to said output coil through the same signal channel for rectifying the voltage induced in said output coil to produce rectified outputs of positive and negative polarities, an integrator, second switch means for selectively supplying the positive or negative rectified output to said integrator, a comparator operable in response to successive opposite polarity intervals of said rectified output applied to said integrator for comparing the output from said integrator with a zero potential, and a pulse counter controlled by the output from said comparator whereby to provide a digital output corresponding to the conductivity of said liquid.

2. Apparatus according to claim 1 in which said first and second switch means are operable to alternately accumulate a first quantity in said integrator in response to one of said polarities representative of the conductivity of said liquid and to integrate in equal second quantity in response to the other said polarity representative of said predetermined proportion to obtain an output quantity substantially independent of circuit parameters representative of said conductivity.

3. Apparatus according to claim 2 in which said first quantity is representative of the difference between the signal induced in said second core by the conductivity of said fluid and that impressed on said second coil.

4. An electromagnetic induction type conductivity measuring apparatus comprising a first magnetic core, a first coil wound on said first magnetic core, a source of alternating current, first switch means for selectively supplying an exciting current to said first coil, a second magnetic core, a second coil wound on said second core, a voltage divider selectively connected across said source for impressing a predetermined proportion of the voltage of said source across said second coil, and an output coil wound on said second core, said first and second cores being adapted to be immersed in conductive liquid whose conductivity is to be measured, rectifier means coupled to said output coil through the same signal channel for rectifying the voltage induced in said output coil to produce rectified outputs for each position of said switch of positive and negative polarities, an integrator, second switch means operating in conjunction with said first switch means for selectively supplying the positive or negative rectified output to said integrator, a comparator operable in response to successive opposite polarity intervals of said rectified output applied to said integrator for comparing the output from said integrator for two successive switch intervals with a zero potential, and a pulse counter controlled by the output from said comparator whereby to provide a digital output corresponding to the conductivity of said liquid that is substantially independent of circuit parameters.

5. The method of measuring the conductivity of a liquid comprising the steps of generating a first alternating magnetic flux to induce a current in said fluid and sensing the induced current flowing in said fluid by generating a second magnetic flux in response thereto, generating a third magnetic flux of known proportion in relation to said first magnetic flux, integrating signals through the same signal channel representative of said second and third magnetic fluxes for periods of time to obtain correspondence therebetween, comparing the integrated signals with a reference potential, and controlling an indicator with the result of said step of comparing to indicate the conductivity of said fluid in terms of the relative length of said periods of time.

6. The method according to claim 5 in which said integration signals are representative of the difference between said second and third magnetic fluxes and said third magnetic flux.

* * * * *